Figure 1:
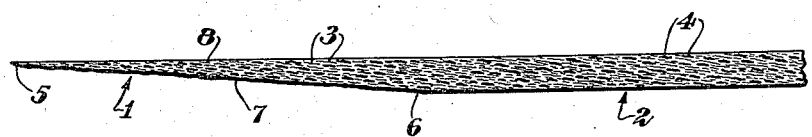

July 20, 1937.  L. A. GRIFFIN  2,087,283

FRICTION MATERIAL AND METHOD OF MAKING THE SAME

Filed April 21, 1934

INVENTOR.
Leon A. Griffin.
BY D. h. Halstead.
ATTORNEY.

Patented July 20, 1937

2,087,283

UNITED STATES PATENT OFFICE 2,087,283

FRICTION MATERIAL AND METHOD OF MAKING THE SAME

Leon A. Griffin, Great Neck, N. Y., assignor to Johns-Manville Corporation, New York, N. Y., a corporation of New York Application April 21, 1934, Serial No. 721,688

1 Claim. (Cl. 188—250)

This invention relates to an improved friction material and method of making the same.

The invention relates especially to a band containing friction binder compound and elongated particles, a predominating proportion of the elongated particles being oriented generally in a direction that is oblique to the length of the band.

As a step in the manufacture of the improved material, there is first formed a hollow cylinder of composition comprising friction compound and fibres oriented generally in direction parallel to the edge of the cylinder. Such intermediate product may be prepared on a conventional millboard machine or by a "layer accretion" method as described in the specification of U. S. Patent 1,771,749, issued on July 29, 1930 to Frank J. Eisenhardt. The present invention will be particularly described as an improvement upon that disclosed in the said Eisenhardt patent.

In using brake lining against a conventional rotating brake drum, a given point on the drum passes over the brake band in direction parallel to the length of the band. Since, in the Eisenhardt brake lining, the elongated particles are oriented in substantial proportion, generally, in direction parallel to the length of the band, the direction of orientation of these particles is parallel also to the direction of movement of any given point on the brake drum past the lining.

The Eisenhardt patent describes also the method of inserting "short bits of wire" into the brake lining. By using wires of readily fusible metal, such, for example, as lead or zinc, antiscoring properties may be imparted to the lining. In minimizing scoring, it is desirable that the short bits of wire should contact with all portions of the brake drum, in order to scavenge therefrom particles that, if not removed, might increase the scoring or to act in other manner upon the entire surface of the brake drum. For this reason or to provide for uniformity of action of the asbestos fibres over the entire area of the brake drum, it is desirable that the elongated particles incorporated into the brake lining and oriented with respect to each other should lie obliquely with respect to the length of the band of brake lining.

The present invention is illustrated in the drawing in which

Figure 2:

Fig. 1 shows a plan view of the improved brake lining in a development stage; and Fig. 2 shows a perspective view of a finished piece of the improved brake lining.

The figures show a composition adapted for use as a lining of automotive brakes or the like comprising, in the development stage, a tapered portion 1 that is continuous with a portion 2 of substantially uniform width.

The composition contains a friction binder compound of any suitable type. There has been used to advantage, a friction binder compound including a large proportion of rubber or polymerized chloroprene with usual compounding ingredients. The composition includes also elongated particles dispersed individually in the binder compound. These particles may be fibres 3 of the type of asbestos and particles 4 of antiscoring agent, such as short lengths of fusible metal wire of the type described.

It will be seen that the elongated particles in predominating proportion are oriented in a general direction that is slightly oblique to the length of the band, in the portion of uniform width (Fig. 1) or to the length of the finished product shown in Fig. 2, the inclination of the elongated particles to the edge of the band being exaggerated for clearness of illustration.

The apparatus used in the manufacture of the improved article is that described in the said Eisenhardt patent supplemented by cutting means that may be conventional and, therefore, are not illustrated.

In making the improved article there is formed a mixture of the binder compound and elongated particles dispersed therein. Thus, there may be made a plastic, intimate mixture of rubber friction compound, asbestos fibres, short lengths of lead wire, and a rubber solvent or softening medium, such as gasoline. The mixture is gradually sheeted around a cylindrical member such as the heated roll illustrated by Eisenhardt, whereby the mixture is shaped into a hollow cylinder adhered to and supported by the said cylindrical member. As the sheeting or forming of the hollow cylinder proceeds, as described by Eisenhardt, there is orientation of a predominating proportion of the elongated particles in direction generally transverse to the length of the hollow cylinder, that is, parallel to the edge thereof or to the direction of movement of a given point on the surface of the revolving heated roll.

An improvement over the Eisenhardt patent is made in that the mixture constituting the hollow cylinder, suitably while still supported by the cylindrical member, is cut spirally in a line beginning at one end of the hollow cylinder and advancing regularly toward the other end of the cylinder, the amount of the advancement for a complete revolution of the cutter around the cylinder, or of the cylinder with respect to the cutter, corresponding approximately to the width desired in the band of finished brake lining. In this manner there is formed a strip of material which, as illustrated in Fig. 1, begins at the point 5 and increases gradually in width to the position indicated at 6, the distance between the point 5 and the position 6 being approximately equal to the circumference of the hollow cylinder of shaped material. Beyond the position 6, the band has substantially uniform width, tapering out again as the cutter approaches the end of the cylinder remote from that at which the cutting was initiated. Between the positions 5 and 6, one side of the strip may be slightly uneven, since this side corresponds to the one edge of the material as shaped into the said hollow cylinder. Also, in the portion between positions 5 and 6 the direction of orientation of the elongated particles is generally parallel to the direction of the uneven edge 7 and oblique to the edge 8 formed by the cutting tool. In the portion of equal width, to the right of position 6 in Fig. 1 or in the finished article of Fig. 2, the elongated particles will have the same degree of obliquity with respect to each side of the article, inasmuch as both sides (edges) now have been formed by the cutting tool, after the completion of the first revolution of cutting.

After the spiral cutting is completed, the resulting band of material may be severed into pieces of desired length, vulcanized, die-pressed, perforated, and/or subjected to other finishing operations that are conventional in the making of brake lining. It will be understood that the tapered portions of the material, such as that between positions 5 and 6, are suitably rejected and reserved, in unvulcanized condition, for incorporation into a later batch of the composition to be worked on the sheeter roll.

The degree of obliquity or inclination of the elongated particles to the edge or to the length of the finished band of brake lining will vary with the conditions prevailing during manufacture. Thus, a small circumference of the hollow cylinder of material being cut spirally and a large advancement of the cutting tool from one end of the hollow cylinder toward the other, for each revolution of the hollow cylinder with respect to the knife, are factors favoring relatively large inclination of the elongated particles to the length of the finished band.

With a brake lining made as described and placed in a conventional automotive brake assembly, the elongated particles dispersed in the lining are adapted to scour or to contact, over the full width of the band, with a brake drum moved in frictional engagement with the band and in direction parallel to the length thereof.

Furthermore, the method of manufacture possesses certain desirable features. For example, the cutting of a single width of brake band from a hollow cylinder of the material, while the uncut portion thereof is adhered to the roller, minimizes the tendency to slippage of the material on the roller, buckling, or other distortion under the pressure of the cutting tool. Also, it is possible, in this manner, to cut approximately the entire batch of material on the sheeter at one time into a single long continuous strip substantially greater in length than the circumference of the hollow cylinder, that may be sold in roll form and cut, as needed, into appropriate lengths for various brake shoes.

It will be understood that the details given are for the purpose of illustration, not restriction, and that variations may be made therefrom within the scope of the appended claim.

What I claim is:

A brake lining strip consisting of a spirally cut section of a hollow cylinder of a layer-accreted mixture including a binder and fibrous material, and of a length greater than the circumference of said cylinder, a predominating portion of said fibrous material being oriented in said cylinder in a direction generally parallel to the edges thereof and in an oblique position in the spirally cut strip relative to the side edges thereof corresponding to the angle of the spiral cut.

LEON A. GRIFFIN.